United States Patent [19]

Karasek' Francis W. et al.

[11] Patent Number: 5,113,772
[45] Date of Patent: May 19, 1992

[54] SUPPRESSION OF DIOXIN PRODUCTION IN THE INCINERATION OF WASTE MATERIAL

[75] Inventors: Karasek' Francis W.; Krishnat P. Naikwadi, both of Waterloo, Canada; Otto Hutzinger, Bayreuth, Fed. Rep. of Germany

[73] Assignee: University of Water of Waterloo, Waterloo, Canada

[21] Appl. No.: 552,522

[22] Filed: Jul. 16, 1990

[51] Int. Cl.[5] .................. F23J 11/00; F23J 15/00
[52] U.S. Cl. .................................. 110/345; 110/342; 110/346; 423/232
[58] Field of Search ............. 110/342, 344, 345, 346; 423/210, 232

[56] References Cited

U.S. PATENT DOCUMENTS

| | | | |
|---|---|---|---|
| 4,648,331 | 3/1987 | Thelen | 110/342 |
| 4,681,045 | 12/1988 | Dvirka | |
| 4,726,302 | 2/1988 | Hein et al. | 110/345 |
| 4,793,270 | 12/1988 | Karasek et al. | |
| 5,021,229 | 6/1991 | Gullett | 110/345 X |

FOREIGN PATENT DOCUMENTS 3527615 2/1987 Fed. Rep. of Germany .
3632366 3/1988 Fed. Rep. of Germany .

*Primary Examiner*—Edward G. Favors
*Attorney, Agent, or Firm*—Sim & McBurney

[57] ABSTRACT

Formation of toxic polychlorinated dibenzo-p-dioxins and other chlorinated compounds by catalytic reactions on flyash produced in the process of solid waste incineration is a universal phenomenon. By providing inhibitors which adsorb on the flyash prior to catalytic reaction initiation to suppress catalytic reactions on the flyash, in the postcombustion zone of the incinerator, or by spraying the inhibitors on the solid wastes prior to incineration, has resulted in a decrease in dioxins and other chlorinated compounds on the flyash and in the stack emissions. Introduction of inorganic and organic basic compounds on solid waste or between combustion and precipitation regions of the incinerator also decreases acid gases in the stack emissions.

20 Claims, 6 Drawing Sheets

GC-ECD RESPONSE FOR A LABORATORY STANDARD CONTAINING
CHLORINATED DIOXINS AND DIBENZOFURANS

GC-ECD RESPONSE FOR THE COMPOUNDS IN THE FLY ASH SAMPLE THAT WAS COLLECTED DURING NORMAL OPERATION OF THE MSW INCINERATOR

GC-ECD RESPONSE FOR THE COMPONDS IN THE FLY ASH SAMPLE THAT WAS COLLECTED DURING INHIBITOR (MIXTURE OF MENA+TENA) INJECTION IN THE OPERATING INCINERATOR

SUPPRESSION OF DIOXIN PRODUCTION IN THE INCINERATION OF WASTE MATERIAL

FIELD OF INVENTION

The present invention relates to the incineration of waste materials and, in particular, to the suppression of chlorinated organics including dioxins and furans on the flyash and in the stack emissions from such incineration, as well as to the suppression of acid gases, in particular, HCl and $SO_2$, in the stack emissions from such incineration.

BACKGROUND TO THE INVENTION

Incineration, an attractive alternative to burying in a landfill for the disposal of urban garbage, is practiced throughout the world and results in a considerable decrease in waste volume and the recovery of energy in the form of steam or electricity. One of the significant drawbacks to the incineration procedure is that several hundred stable and toxic compounds, including polychlorinated dibenzo-p-dioxins (collectively commonly termed "dioxins") and polychlorinated dibenzofurans (collectively commonly termed "furans"), are formed and are presented in parts-per-million concentrations both in the flyash formed during combustion and in the stack emissions.

A large city may incinerate 3 to 5 million tons of garbage annually. For every million tons of urban waste incinerated, about 34,000 tons of flyash are produced by the typical incinerator. Between 95 and 99% of the flyash is precipitated electrostatically and buried in landfills. The remainder is emitted from the incinerator stacks along with the gaseous by-products, namely water vapour, HCl, $SO_2$, $CO_2$, air and volatilized organic compounds. The gaseous stack emission introduces dioxins, furans and other toxic chlorinated compounds to the atmosphere. Landfill disposal of flyash introduces dioxins, furans and other hazardous organic chlorinated compounds into the earth from where they may be leached into ground water systems.

The primary hazard of the most toxic of these organic compounds, dioxins and furans, to humans may be cancer in the long term, but dioxins exert a much higher impact on the general environment and are considered undesirable. There exists, therefore, a need for a means to decrease the dioxins, furans and other chlorinated compounds content of both solid and gaseous by-products from incinerator systems. It is also essential to decrease emissions of acid gases produced in the incineration process.

There has been previously described in U.S. Pat. No. 4,793,270, naming two of us as inventors, the disclosure of which is incorporated herein by reference, the surprising discovery that the flyash which is formed during the incineration of solid municipal waste catalyses the formation of dioxins from chlorinated phenols formed from combustion products of plastics, paper and chemicals, and several other dioxin precursors in the gaseous combustion products. Accordingly, as described in that patent, a material acting as a catalyst inhibitor is provided in association with the flyash so as to inhibit the catalytic activity of the flyash towards the formation of chlorinated compounds including dioxins and furans.

SUMMARY OF INVENTION

It has now been found that alkanolamines and inorganic bases (herein termed inhibitor mixtures) are very effective in inhibiting dioxin formation as well as the formation of other chlorinated chemicals, and, at the same time, are effective in decreasing the acid (mainly HCl and $SO_2$) content of the incineration gas emissions. Ammonia ($NH_3$) also may be employed as an inhibitor in place of the inhibitor mixture and may be readily introduced as a gas.

Accordingly, in one aspect, the present invention is directed towards the suppression of the formation and hence occurrence of chlorinated organic compounds, including dioxins and furans on flyash produced during municipal solid waste incineration.

In another aspect, the present invention is directed towards the suppression of dioxins and acid gases, such as HCl and $SO_2$, in the stack emission of municipal solid waste incineration.

In accordance with one aspect of the present invention, therefore, there is provided a method of disposal of organic material, such as municipal waste or industrial waste, which is combustible to form gaseous chlorinated organic compounds, including toxic dioxins and dibenzofurans, which comprises a plurality of steps.

The organic material is incinerated in an incineration operation, which often is self-sustaining to form gaseous products of incineration containing flyash, precursors for the formation of chlorinated organic compounds, and acid gases, and the gaseous products of incineration are passed to a precipitation step wherein the flyash is precipitated from the gaseous products of incineration.

The surface of the flyash during the passage of the gaseous products of incineration to the precipitation step is contacted with a small quantity of at least one inhibition substance which reacts with catalytically-active sites on the surface of the flyash, so as to inhibit catalytic effects of the flyash towards the formation of chlorinated organic compounds, including toxic dioxins, from the precursors during the passage.

Chlorinated organic compounds and the acid gases are reacted with the at least one inhibitor substance in the gaseous products of incineration to suppress the chlorinated organic compounds and acid gases in a vented product gas stream. The product gas stream is vented after the precipitation of flyash from the gaseous products of incineration.

The prior patent exemplified the process employing carbon disulphide, sulphur dioxide and thiophenes as inhibitors. The materials employed herein possess certain advantages in comparison with the prior art materials. In particular:

(i) the quantity of chemical required herein to achieve a greater than 95% inhibitor effect is much less than was observed in the prior art and the chemicals employed herein tend to be much less costly than the prior art ones, leading to overall economies in the process (ii) The chemicals employed herein are generally water soluble and the resulting solutions are readily employed and handled in the operating plant, whereas the prior art chemicals are less readily employed and handled, and (iii) The chemicals employed herein are basic in nature and exhibit an acid gas decreasing effect, whereas the prior chemicals tend to generate acid gases.

The present invention is described herein mainly with respect to the inhibition of the formation of dioxin and other chlorinated compounds and to decreasing the acid gas content of the vent gas stream in municipal solid waste incinerators. However, the present invention is broadly applicable to achieving such effects in the incineration of any material that is organic in origin, including not only municipal solid waste, but also sewage sludge and industrial waste, and which is combustible to form gaseous chlorinated organic compounds, including precursors for dioxin formation.

GENERAL DESCRIPTION OF INVENTION

Figure 1:
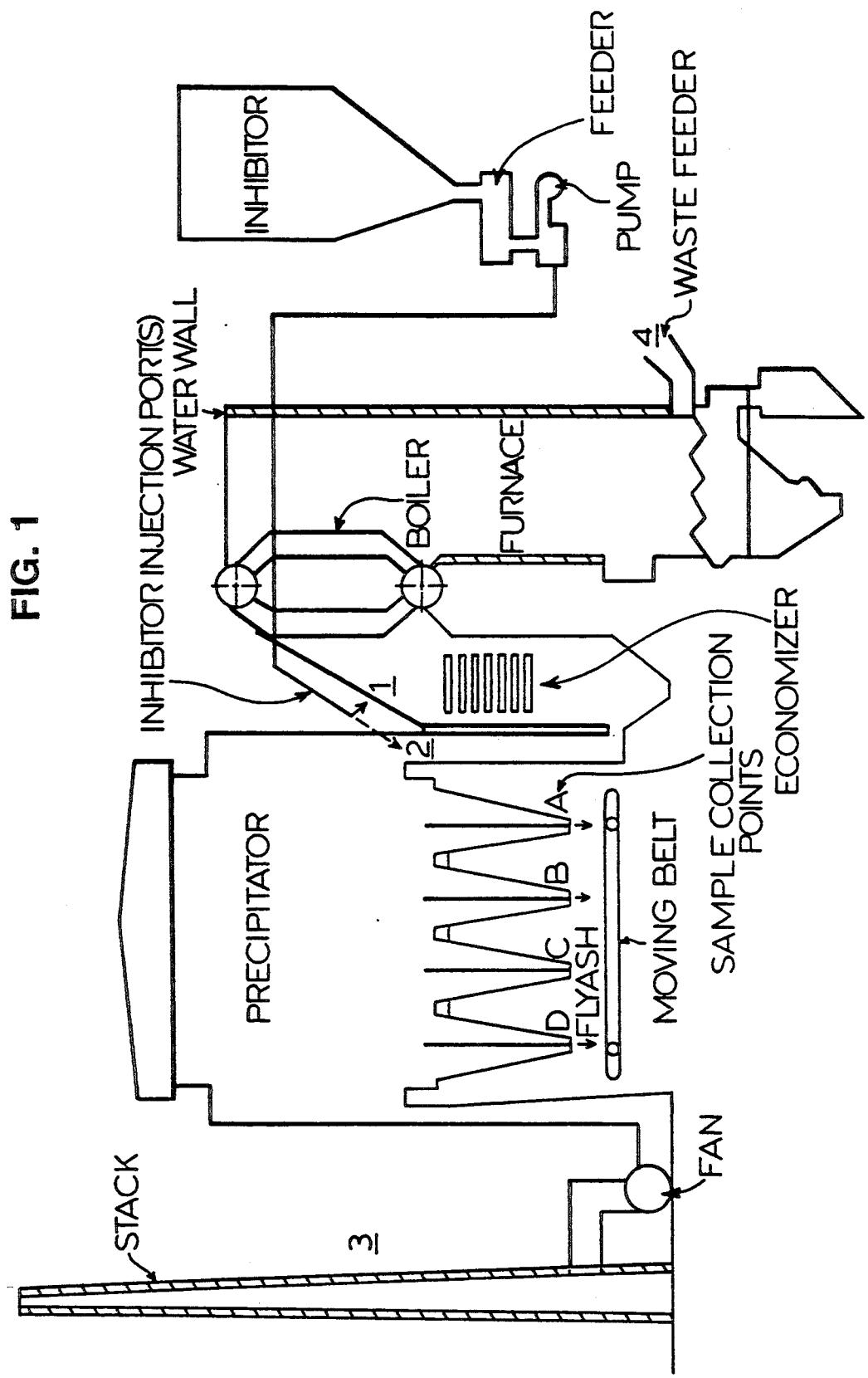
FIG. 1 is a schematic representation of a typical municipal solid waste incinerator, showing locations for introduction of inhibitor mixtures (points 1, 2 and 4) according to the process of the invention.

In the present invention, there are employed certain inhibitor mixtures to effect dioxin inhibition. Such inhibitor mixtures may comprise at least one alkanolamine.

Alkanolamines that have been found to be particularly effective are monoethanolamine (MENA), triethanolamine (TENA) and monoisopropanolamine (MIPA).

The inhibitor mixtures may also comprise at least one inorganic base. Inorganic bases found to be effective are sodium hydroxide (NaOH), potassium hydroxide (KOH), sodium carbonate (Na$_2$CO$_3$), calcium oxide (CaO), magnesium oxide (MgO), sodium orthosilicate (Na$_4$SiO$_4$) and sodium metasilicate (Na$_2$SiO$_3$).

Such inorganic bases may be employed separately or in different combinations with alkanolamines, preferably as an aqueous solution thereof or in solid particulate form.

Laboratory tests using such inhibitors (1 to 4% by wt. of flyash) separately or in mixtures thereof show that more than 98% inhibition of dioxin formation occurs on the flyash from reaction of a known dioxin precursor, pentachlorophenol (PCP), at 300° C. (see Examples below for details). The inhibitor mixtures, such as alkanolamines combined with inorganic bases, may be applied to the municipal waste material prior to combustion (i.e. feed point 4 in FIG. 1) or during combustion to the flyash between boiler and precipitator (i.e. feed points 1 and 2 in FIG. 1).

Several mixtures of above-described specific inhibitor materials were tested in laboratory inhibition experiments and also in a large operating incinerator (see Examples below for details). The inhibitor mixtures employed in the operational incinerator were 1) MENA+TENA+water, 2) TENA+KOH+water, 3) MENA+TENA+CaO. A reduction of dioxins in the flyash by 80% or more was observed. In addition, a reduction of dioxins in the stack emissions by 78% or more and a reduction of HCl and SO$_2$ by 78 to 80% or more in the stack emissions have been observed.

In this way, inhibitors effectively poison the catalyst sites on the flyash, so that the quantity of various dioxins, furans and other chlorinated compounds present in the tail gas stream and on the precipitated flyash is significantly decreased.

Dioxins are a family of chlorinated products having the general formula:

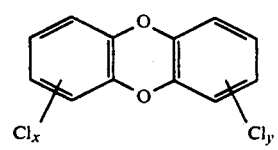

while the related furans have the general formula:

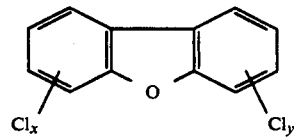

The dioxins and the furans exhibits varying degree of toxicity, depending on the number of chlorine atoms present, with those compounds having greater numbers of chlorine atoms being more benign than those with lesser numbers of chlorine atoms.

It is known that dioxin formation can occur though thermal reaction of precursors, such as pentachlorophenol, which are formed as combustion products from various organic materials in the solid waste material to form the octachlorodioxin, as follows:

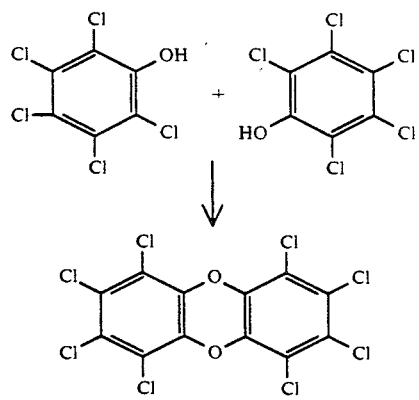

We have found that, through catalytic reactions on the flyash octachlorodioxin forms at lower temperatures (approximately 200° to 400° C.), and much faster, and the octachlorodioxin then can be catalytically converted to dioxins having lesser numbers of chlorine atoms on the benzene rings by the action of the flyash. Other precursors, such as polychlorophenols also can form dioxins through such catalytic reaction sequences.

Many other precursors of dioxins and furans have been identified by our research, including products of combustion of chlorinated polymeric materials, such as polyvinyl chloride and inked newsprint. We have recent evidence to support the concept that dioxin precursors are simply intermediate compounds formed from more primary combustion products, such as HCl, CO, $H_2O$, $H_2$, $C_2H_2$ and $C_2H_4$, by catalytic reactions on the flyash. Accordingly, inhibition of catalytic properties of the flyash decreases the formation of all chlorinated compounds (see FIG. 5).

By using the inhibitors of the present invention, such catalytic effects are decreased and minimized, hence decreasing the formation of all chlorinated compounds and thereby the more toxic lesser chlorinated dioxins and furans, and resulting in a decreased concentration of such materials on the flyash and in the vent gas stream from the incinerator.

In addition, by preventing formation of the lesser chlorinated species, the overall amount of dioxins entering the flue gases is decreased by virtue of the lower vapour pressure of the octachlorodioxin. Only small quantities of inhibitor mixtures are required to achieve the desired result, generally from about 0.01 to about 0.2 wt. % of the solid waste material incinerated.

One significant benefit that results from the use of the mixtures of inhibitors herein, in addition to the decrease in dioxin content of the combustion gas stream, is a decrease of the acid gas content, in particular HCl and $SO_2$, of the combustion gas stream.

EXAMPLES

Example 1

This Example shows that the flyash samples from different incinerators promote the production of chlorinated dioxins under simulated incinerator conditions.

An experimental test apparatus was set up consisting of a vertically oriented oven with a glass tube (25 × 1 cm I.D.) surrounded by the oven. Part of the flow tube was a reservoir containing flyash from the municipal solid waste incinerator (MSWI). The flyash sample had been exhaustively extracted with solvent heated at 300° C. to remove all organic compounds.

In each experiment, 1.5 g of pre-cleaned flyash was placed in the glass tube. A volume of 50 microliters (ul) of 5 ug/ul $^{13}$C-PCP solution in methanol was deposited on the glass beads on the top of the flyash and the solvent allowed to evaporate. The section of the tube containing flyash and PCP was heated at 300° C. for 60 minutes using 3 ml/minute flow of dry air. After completing the experiment, the flyash was spiked with an internal standard for recovery estimates. Organic compounds formed on the flyash and the internal standards were extracted by eluting with 220 ml toluene. Extracts were concentrated by rotary evaporation to a few ml and final concentration in a sample vial to 500 ul under a gentle stream of $N_2$.

Figure 2:
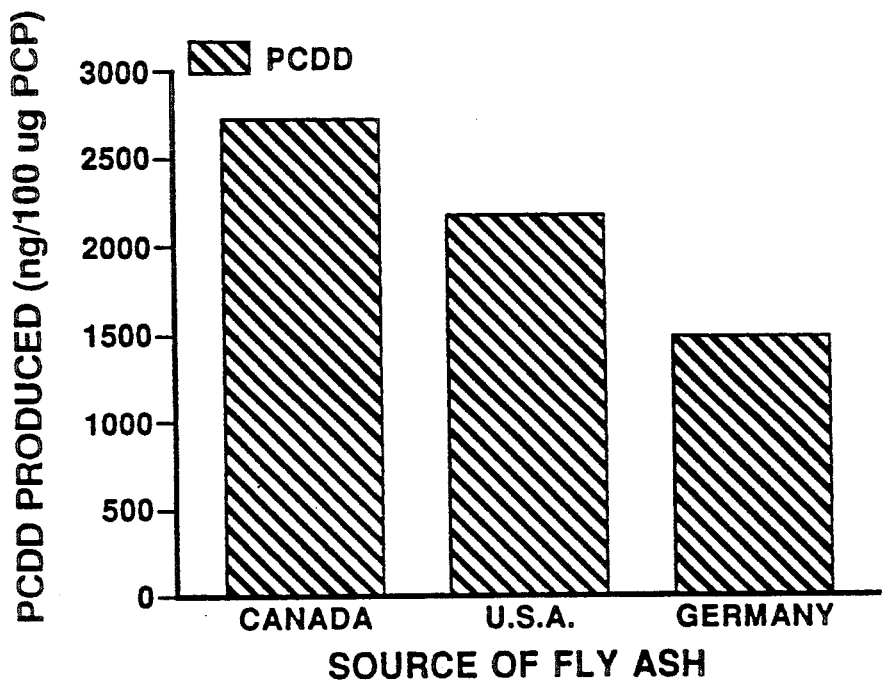
FIG. 2 is a bar graph showing $^{13}$C-labelled polychlorinated dibenzo-p-dioxins (PCDD) produced from $^{13}$C-labelled pentechlorophenol ($^{13}$C-PCP) by the catalytic activity of the flyash samples from various incinerators located in different countries.

FIG. 2 shows the bar graph for the amounts of PCDDs produced by the catalytic activity of flyashes from Canada (Ontario), U.S.A. (Sunlakes), Germany (Krefeld) incinerators.

Example 2

This Example illustrates that the catalytic production of dioxins from PCP can be suppressed. Based on the data presented in Example 1 and the data in the previous patent (U.S. Pat. No. 4,793,270) and similar results from our experiments, it is clear that the formation of dioxins occurs on the flyash due to catalytic activity of the flyash.

Inhibition of the flyash catalytic activity, therefore, should prevent the catalytic effect and thus prevent the formation in the incineration process, of some or all of the chlorinated compounds, including dioxins. Separate tests were conducted on the flyash from U.S.A. incinerator, in which separately or incombination (A) monoethanolamine (MENA), (B) triethanolamine (TENA), (C) monoisopropanolamine (MIPA), (D) sodium hydroxide (NaOH), (E) potassium hydroxide (KOH), (F) sodium carbonate ($Na_2CO_3$), (G) TENA+KOH, (1:1 mixture), (H) TENA+NaOH (1:9 mixture), (I) TENA+NaOH (2:8 mixture), (J) TENA+KOH (2:8 mixture) and (K) $NH_3$ were added to the flyash prior to the catalytic activity test performed as described in Example 1. Anhydrous ammonia (K) was injected upstream to the flyash in the air stream during the test of its inhibition ability.

Figure 3:
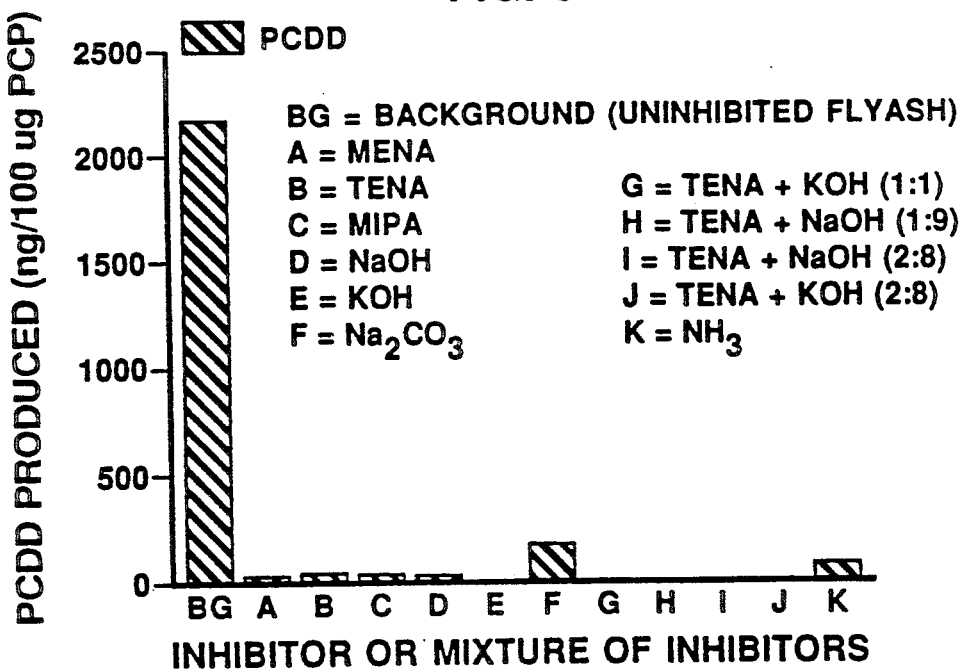
FIG. 3 is a bar graph showing the amounts of $^{13}$C-PCDD formed in laboratory tests from $^{13}$C-PCP by the catalytic activity of uninhibited flyash (background = BG) and flyash treated by various uninhibitors, where BG = PCDD produced on uninhibited flyash, A to K are the different inhibitors added to the flyash prior to inhibition test. A=MENA, B=TENA, C=MIPA, D=NaOH, E=KOH, F=Na$_2$CO$_3$, G=TENA+KOH (1:1 Mixture in Water), H=TENA+NaOH (1:9 mixture in water), I=TENA+NaOH (2:8) mixture in water), J=TENA+KOH (2:8 mixture in water), K=anhydrous ammonia (2 wt. % of flyash injected during test). The amount of inhibitor used was 2 to 4% by wt. of flyash.

The results of these laboratory inhibition tests are presented in FIG. 3. Organic inhibitors alone were highly effective when used in an amount of 2% by wt. of flyash. To obtain similar effect, a mixture of organic and inorganic inhibitor of 4% by wt. of flyash was required.

Example 3

This Example illustrates that the production of dioxins in operating municipal solid waste incinerator (MSWI) can be suppressed using organic inhibitors.

A schematic of the MSWI is shown in FIG. 1. Based on the laboratory tests and results thereof, plant tests were conducted in an operating MSWI. A mixture of 25% monoethanolamine, 25% triethanolamine (about 0.1 to 0.2 wt. % of solid waste) and 50% water was introduced in the post combustion zone of the incinerator (FIG. 1, Point 2), at a temperature of about 350° C. Flyash samples were collected prior to and during the injection of the inhibitor mixture.

Figure 4:
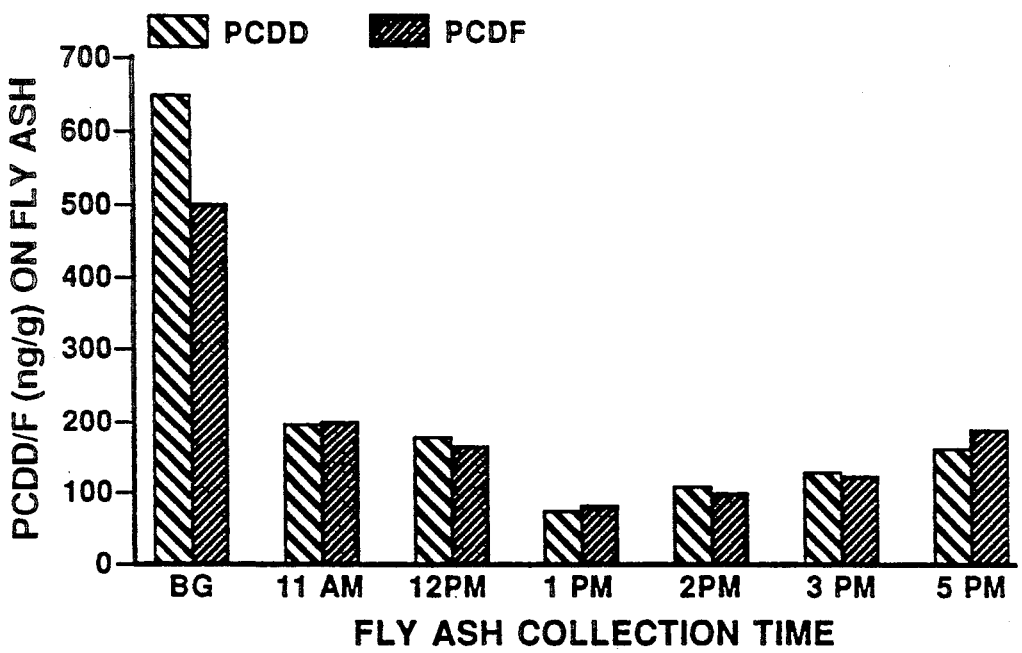
FIG. 4 is a bar graph showing the comparison of the amounts of PCDD and PCDF formed on the flyash during the normal operation (background=BG) and during the introduction of inhibitor mixture 1 in the municipal solid waste incinerator. During the plant test, inhibitor (0.2 wt. % of the solid waste) introduction was started at 10.00 am and terminated at 1.30 pm.
Figure 5A:
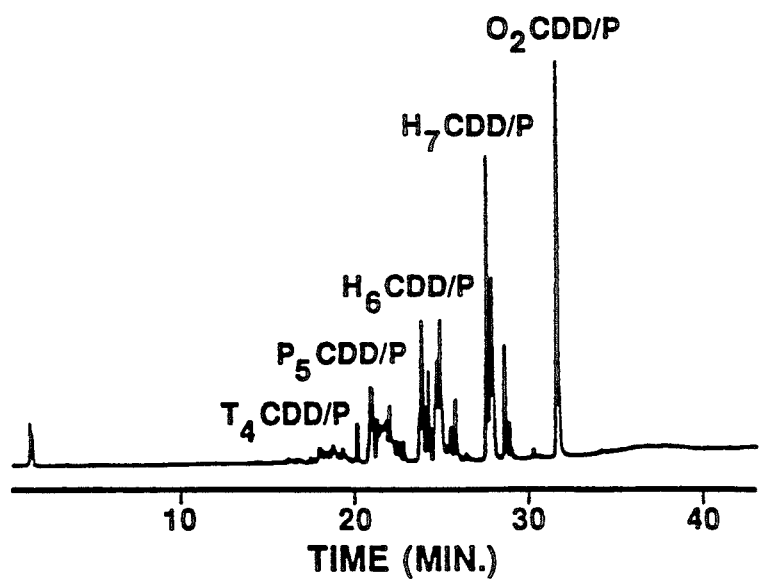
FIG. 5 is a chromatogram showing the response of electron captor detector for the chlorinated compounds in samples extracted from uninhibited and inhibited flyash in the plant test represented by data in FIG. 4.
Figure 5B:
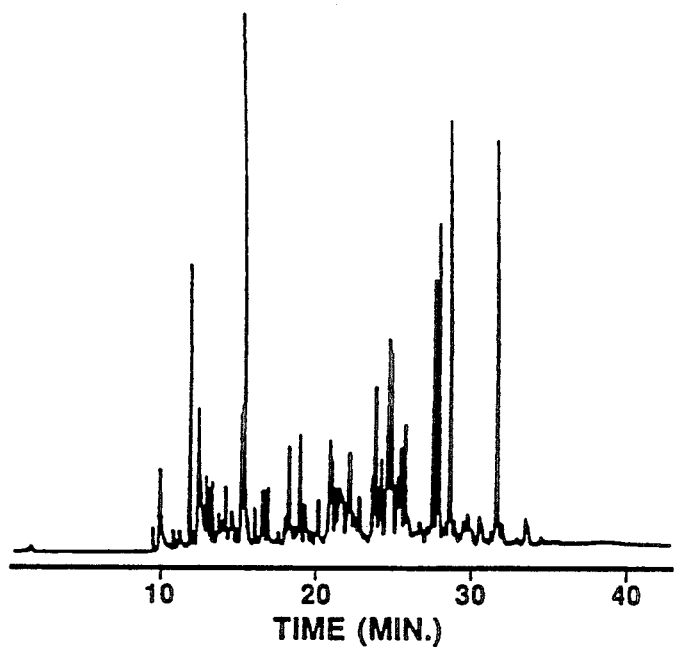
Figure 5C:
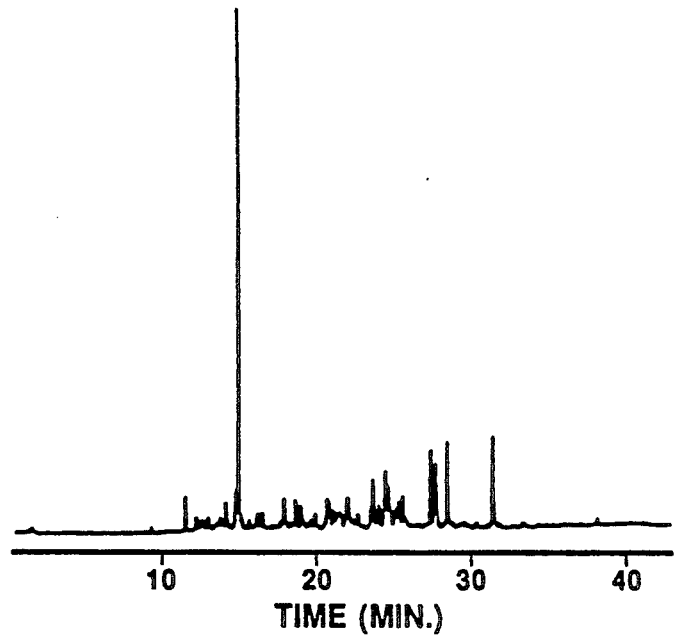

Amounts of dioxins and furans detected in various flyash samples collected under different conditions are shown in FIG. 4. The amount of inhibitor injected (0.1 to 0.2 wt. % of refuse feed) was calculated from the amount of flyash produced per unit time. The bar graph of FIG. 4 clearly indicates that the suppression in PCDD/PCDF occurred during injection of inhibitors. FIG. 5 shows the plots of gas chromatography/electron capture detector response for various chlorinated compounds produced prior to and during introduction of the inhibitor mixture in the operating incinerator. It is clear from FIG. 5 that the suppression of all chlorinated compounds occurred during the inhibitor mixture introduction.

Example 4

Figure 6:
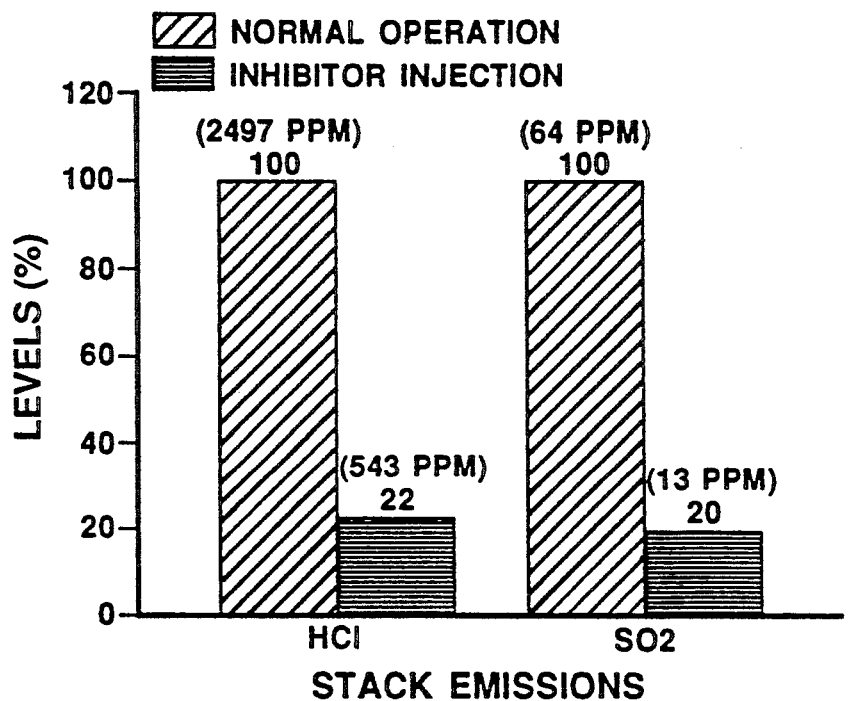
FIG. 6 is a bar graph showing the stack emissions of HCl and SO$_2$ prior (normal operation) and during the introduction of inhibitor in the plant test.

This Example illustrates the decreased acid gas content on the gas stack during the plant test of Example 3, flue gases at stacks (point 3 in FIG. 1) were analyzed for HCl and $SO_2$. The level of HCl and $SO_2$ prior to and during injection of the inhibitor mixture as described in Example 3 are shown in FIG. 6. It has been observed that HCl levels up to 78% and $SO_2$ levels up to 80% were suppressed during introduction of the inhibitor mixture.

Figure 7:
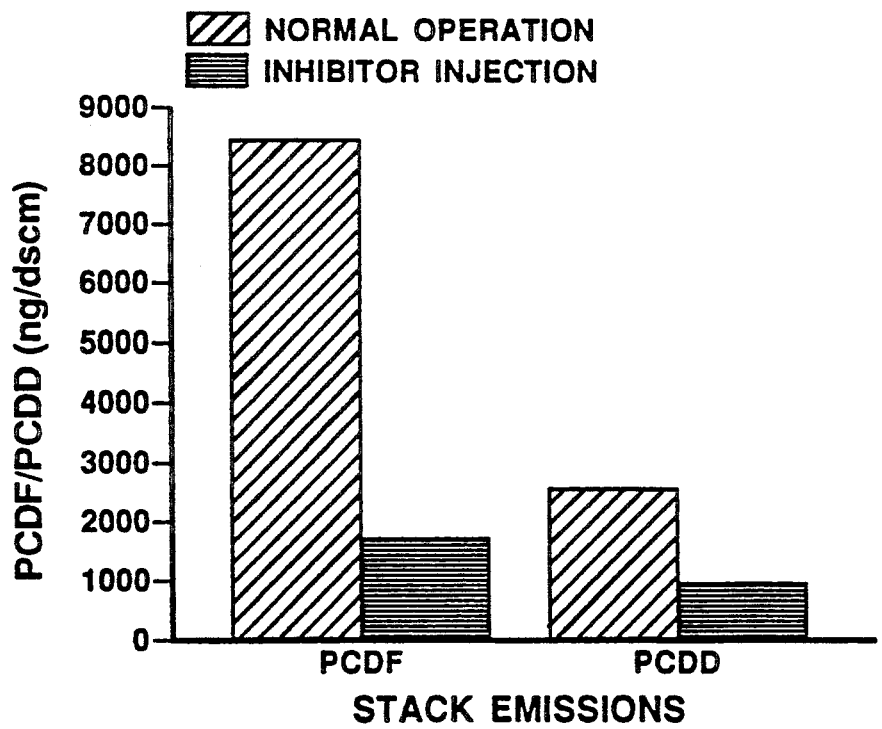
FIG. 7 is a bar graph showing stack emissions of PCDD and PCDF prior (normal operation) and during the introduction of inhibitor in the plant test.

At the same time, the plant flue gas (point 3, in FIG. 1) was analyzed for dioxins and furans. The levels of PCDD and PCDF prior and during introduction of the inhibitor mixture (Example 3) are shown in FIG. 7. It has been observed that dioxin/dibenzofuran levels up to 78% were suppressed during injection of the inhibitor mixture.

Example 5

This Example illustrates that the production of dioxins in operating municipal solid waste incinerator (MSWI) can be minimized using ammonia as an inhibitor.

Figure 8:
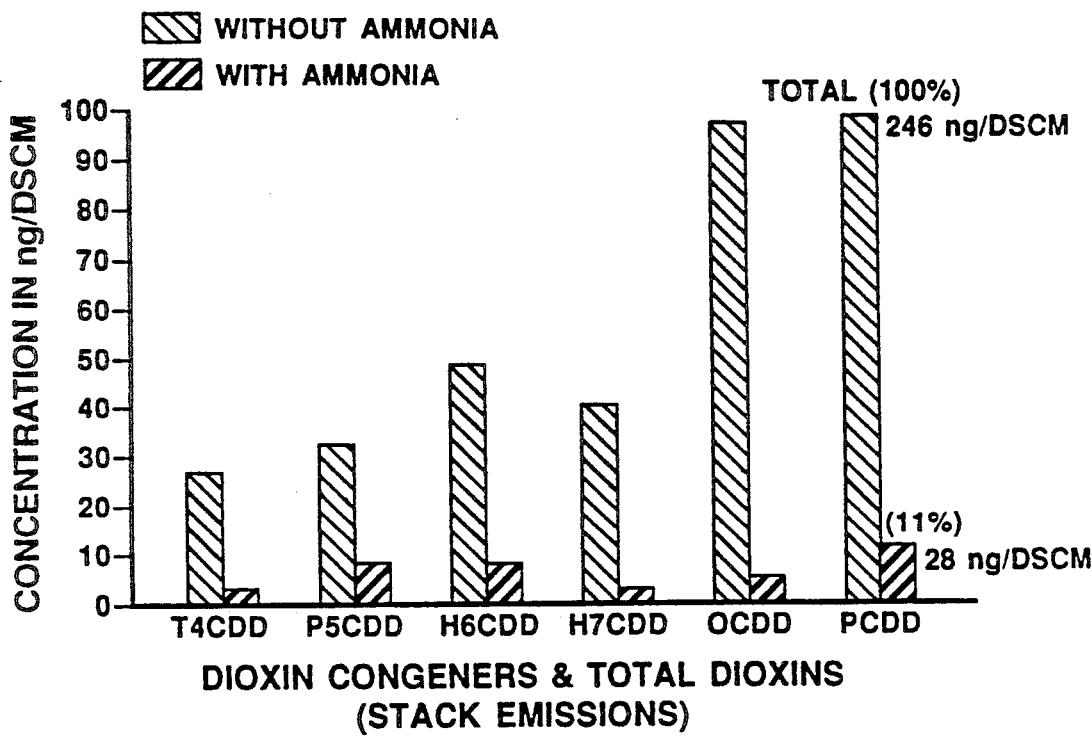
FIG. 8 is a bar graph showing the comparison of the amounts of dioxins and furans, tetra- to octa-congeners and total PCDD and PCDF that were present in the stack emissions during the normal operation (without ammonia) and during the introduction of ammonia (0.2 wt. % of solid waste) in the operating incinerator.

Based on the laboratory tests and results thereof plant tests were conducted in the operating MSWI shown in FIG. 1. Gaseous ammonia (0.1 to 0.2 wt. % of solid waste) was introduced in the post combustion zone of the incinerator (FIG. 1, Point 2). PCDDs/PCDFs were analyzed in the stack emissions prior to and during the injection of the inhibitor ammonia. The amount of PCDDs and PCDFs detected under different conditions are shown in FIG. 8. The amount of inhibitor to be injected (0.1 to 0.2 wt. % of refuse feed) was calculated from the amount of flyash produced per unit time. The bar graph in FIG. 8 clearly indicates that the suppression in PCDDs/PCDFs occurred during injection of ammonia.

Example 6

Figure 9:
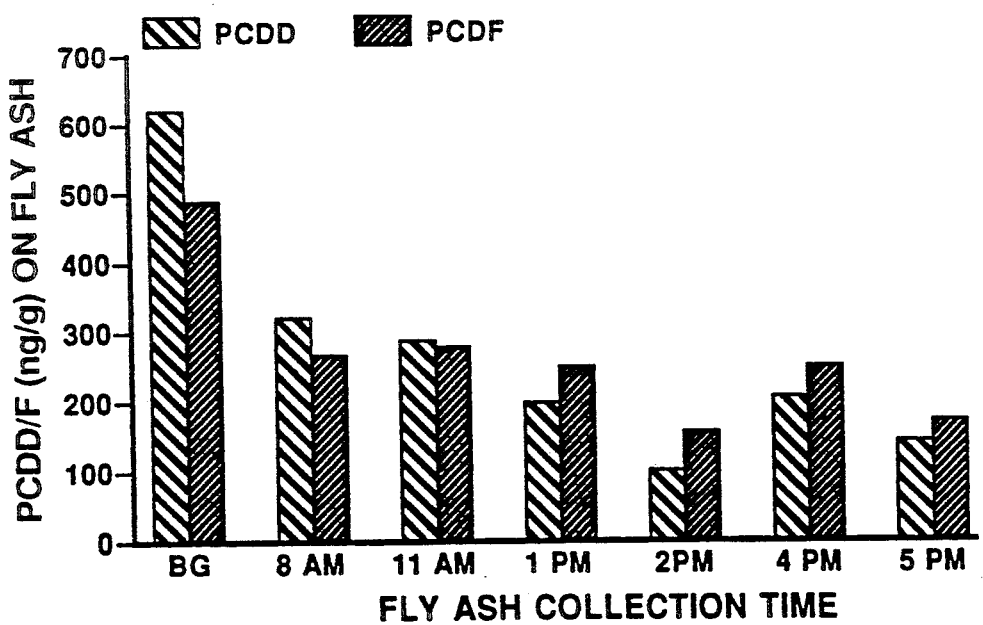
FIG. 9 is a bar graph showing the comparison of the amounts of PCDD and PCDF formed on the flyash during the normal operation (background=BG) and during the introduction of inhibitor mixture 2 in the municipal solid waste incinerator. During the plant test, inhibitor (0.2 wt. % of the solid waste) introduction was started at 8.00 am and terminated at 4.30 pm.

Example 3 was repeated except that a mixture of inhibitors (TENA+KOH+water:4%+30%+66%, total inhibitors 0.1 to 0.2 wt. % of the solid waste), was injected at point 1, FIG. 1 where the temperature was about 400° C. in the plant test. The amounts of dioxins and dibenzofurans produced are shown in FIG. 9. An important aspect of this Example is that it illustrates the possibility of injecting the inhibitor mixture at temperature higher than 350° C., such as at point 1 in FIG. 1.

SUMMARY OF DISCLOSURE

In summary of this disclosure, the present invention provides a method for inhibiting the formation of chlorinated compounds, including dioxins and furans, and for decreasing acid gas formation, in the combustion gas stream from a municipal solid waste incineration procedure by employing certain alkaline compounds. including organic and inorganic inhibitors, such as alkanolamines and various alkaline inorganic compounds of sodium, potassium, magnesium and their mixtures. Modifications are possible within the scope of this invention.

What we claim is:

1. A method of disposal of organic material which is combustible to form gaseous chlorinated organic compounds, including toxic dioxins and dibenzofurans, which comprises:
   incinerating said organic material in an incineration operation to form gaseous products of incineration containing flyash, precursors for the formation of chlorinated organic compounds and acid gases,
   passing said gaseous products of incineration to a precipitation step wherein said flyash is precipitated from the gaseous products of incineration,
   contacting the surface of said flyash during said passage of said gaseous products of incineration to said precipitation step with a small quantity of at least one inhibitor substance which reacts with catalytically-active sites on the surface of the flyash, so as to inhibit catalytic effects of said flyash towards the formations of chlorinated organic compounds, including toxic dioxins and dibenzofurans, from said precursors during said passage,
   reacting said at least one inhibitor substance with chlorinated organic compounds and said acidic gases in said gaseous products of incineration to suppress chlorinated organic compounds and acidic gases in a vented product gas stream, and
   venting said product gas stream after said precipitation of flyash from said gaseous products of incineration.

2. The method of claim 1 wherein said at least one inhibitor substance is provided in association with the flyash.

3. The method of claim 2 wherein said inhibitor substance is provided in association with the flyash by including the inhibitor substance or a precursor thereof in the organic material incinerated, whereby a non-catalytic flyash is produced.

4. The method of claim 3 wherein said inhibitor substance is included in the organic material incinerated by spraying or spreading said inhibitor substance or a precursor thereof on to the organic material prior to the incineration.

5. The method of claim 1 wherein said at least one inhibitor substance is introduced to the gaseous products of incineration between incineration and precipitation.

6. A method of disposal of solid waste material which is combustible to form gaseous chlorinated organic materials, including toxic dioxins and dibenzofurans, which comprises:
   incinerating said solid waste material in an incineration operation to form gaseous products of incineration containing flyash and precursors for the formation of chlorinated organic compounds,
   passing said gaseous products of incineration to a precipitation step wherein said flyash is precipitated from the gaseous products of incineration,
   contacting the surface of said flyash during said passage of said gaseous products of incineration to said precipitation step with a small quantity of at least one alkaline inhibitor substance selected from the group consisting of organic alkaline materials, inorganic alkaline materials and mixtures thereof and which reacts with catalytically-active sites on the surface of the flyash, so as to inhibit catalytic effects of said flyash towards the formation of chlorinated organic compounds, including toxic dioxins, from said precursors during said passage, and venting said gaseous products of incineration after said precipitation of flyash therefrom.

7. The method of claim 6, wherein said at least one alkaline inhibitor substance reacts with the chlorinated organic compounds and acidic gases to decrease the content of gaseous chlorinated organic compounds and acidic gases in said vented gas stream.

8. The method of claim 6 or 7 wherein said inhibitor substance is introduced to the gaseous products of incineration between incineration and precipitation.

9. The method of claim 8 wherein said inhibitor substance is an aqueous solution of an inorganic base selected from the group consisting of sodium hydroxide, potassium hydroxide, calcium oxide, sodium carbonate, sodium orthosilicate, sodium metasilicate, and mixtures thereof.

10. The method of claim 8 wherein said inhibitor substance is a gaseous form of ammonia.

11. The method of claim 6 or 7 wherein said inhibitor substance is included in the solid waste material by spraying or spreading the same on the solid waste material prior to the incineration.

12. The method of claim 11 wherein said inhibitor substance is selected from the group consisting of an aqueous solution of $NH_3$, an aqueous solution of sodium hydroxide, powdered sodium hydroxide, and aqueous solution of potassium hydroxide; powdered potassium hydroxide; an aqueous solution of calcium oxide; powdered calcium oxide; an aqueous solution of sodium carbonate; powdered sodium carbonate; and aqueous solution of sodium orthosilicate; powdered sodium orthosilicate; an aqueous solution of sodium metasilicate; powdered sodium metasilicate; powdered magnesium oxide; and mixtures thereof.

13. The method of claim 1, 6 or 7 wherein the quantity of said at least one inhibitor material is about 0.01 to about 0.2 wt. % of the material incinerated.

14. The method of claim 3 wherein said inhibitor substance is included in the organic material incinerated by including said inhibitor substance or a precursor thereof in a combustion air stream used in said incineration.

15. The method of claim 5 wherein the gaseous products of incineration have a temperature of about 300° C. to about 500° C. at the location of the introduction of the inhibitor substance.

16. A method of disposal of organic material which is combustible to form gaseous chlorinated organic compounds, including toxic dioxins and dibenzofurans, which comprises:

incinerating said organic material in an incineration operation to form gaseous products of incineration containing flyash, precursors for the formation of chlorinated organic compounds and acid gases, passing said gaseous products of incineration to a precipitation step wherein said flyash is precipitated from the gaseous products of incineration, contacting the surface of said flyash during said passage of said gaseous products of incineration to said precipitation step with a small quantity of at least one inhibitor substance which is at least one alkanolamine and which reacts with catalytically-active sites on the surface of the flyash, so as to inhibit catalytic effects of said flyash towards the formation of chlorinated organic compounds, including toxic dioxins and dibenzofurans, from said precursors during said passage, reacting said at least one inhibitor substance with chlorinated organic compounds and said acidic gases in said gaseous products of incineration to suppress chlorinated organic compounds and acidic gases in a vented product gas stream, and venting said product gas stream after said precipitation of flyash from said gaseous products of incineration.

17. A method of disposal of solid waste material which is combustible to form gaseous chlorinated organic materials, including toxic dioxins and dibenzofurans, which comprises:

incinerating said solid waste material in an incineration operation to form gaseous products of incineration containing flyash and precursors for the formation of chlorinated organic compounds, passing said gaseous products of incineration to a precipitation step wherein said flyash is precipitated from the gaseous products of incineration, contacting the surface of said flyash during said passage of said gaseous products of incineration to said precipitation step with a small quantity of at least one alkaline inhibitor substance which is at least one alkanolamine and which reacts with catalytically-active sites on the surface of the flyash, so as to inhibit catalytic effects of said flyash towards the formation of chlorinated organic compounds, including toxic dioxins, from said precursors during said passage, and venting said gaseous products of incineration after said precipitation of flyash therefrom.

18. A method of disposal of solid waste material which is combustible to form gaseous chlorinated organic materials, including toxic dioxins and dibenzofurans, and acid gases, which comprises:

incinerating said solid waste material in an incineration operation to form gaseous products of incineration containing flyash, precursors for the formation of chlorinated organic compounds and acid gases, passing said gaseous products of incineration to a precipitation step wherein said flyash is precipitated from the gaseous products of incineration, venting said gaseous products of incineration after said precipitation of flyash therefrom, and contacting said gaseous products of incineration with a small quantity of at least one alkaline inhibitor substance which is at least one alkanolamine and which reacts with the chlorinated organic compounds and acidic gases to decrease the content of gaseous chlorinated organic compounds and acidic gases in said vented gas stream.

19. The method of claim 16, 17 or 18 wherein said alkanolamine is selected from the group consisting of monoethanolamine, monoisopropanolamine and mixtures thereof.

20. The method of claim 19 wherein said inhibitor material is a mixture of alkanolamines and at least one of the inorganic bases claimed in claim 12.

* * * * *